No. 827,244. PATENTED JULY 31, 1906.
G. A. LARSON.
VEHICLE.
APPLICATION FILED OCT. 2, 1905.
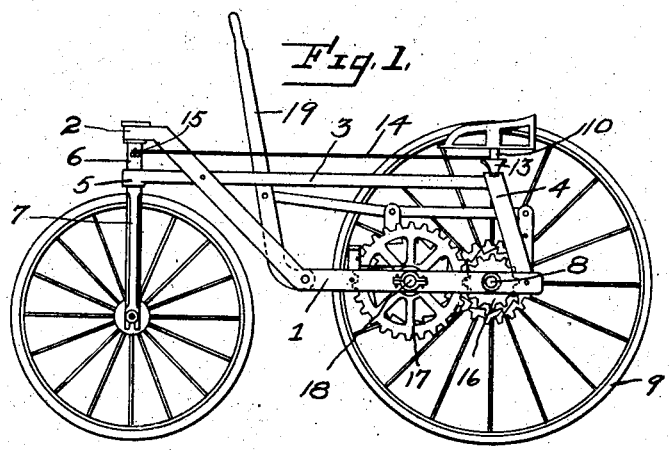
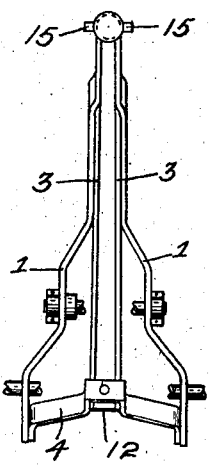
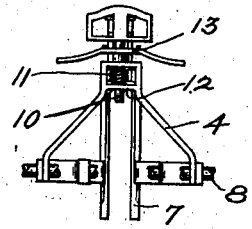
Witnesses
Dudley Wood.
Edward W. Cressman
Inventor
GUSTAF A. LARSON.
By Adams & Brooks
Attorneys

UNITED STATES PATENT OFFICE.

GUSTAF A. LARSON, OF SEATTLE, WASHINGTON.

VEHICLE.

No. 827,244.          Specification of Letters Patent.          Patented July 31, 1906.

Original application filed April 27, 1905. Serial No. 257,755. Divided and this application filed October 2, 1905. Serial No. 281,076.

*To all whom it may concern:*

Be it known that I, GUSTAF A. LARSON, a citizen of the United States of America, and a resident of the city of Seattle, in the county of King and State of Washington, have invented certain new and useful Improvements in Vehicles, of which the following is a specification.

This application is divisional of another application filed by me, bearing Serial No. 257,755; and the invention covered herein relates to improvements in vehicles of that type which are impelled by the rider, having more particular reference to improvements in the frames and the general construction of such vehicles.

The primary object thereof is to provide an improved construction of the nature indicated which will be comparatively simple and inexpensive to manufacture and embracing but few parts, which are not liable to be easily injured or displaced.

With the above and other objects in view, to be referred to in the following, the invention consists of the parts, arrangement, and combinations of parts hereinafter described, and succinctly pointed out in the appended claim.

In the accompanying drawings, in which like numerals of reference indicate like parts throughout the several views, Figure 1 is a view in side elevation of a vehicle constructed in accordance with my invention, one of the driving-wheels thereof being removed. Fig. 2 is a detail view, in top plan, of my improved vehicle-frame; and Fig. 3 is a rear elevation of the frame with the seat in position thereon.

In carrying out my invention I construct a frame comprising the side bars 1, the forward portions of which are inclined upwardly in converging relation and terminate in a socket 2, upper bars 3, and stays 4. These upper bars 3 project between the forward portions of the side bars 1 and are secured thereto in any desired manner, a convenient means, however, consisting of rivets, as shown. The forward ends of these bars 3 terminate in a sleeve 5, which, together with socket 2, forms a support for the head 6 of the fork 7, in which the steering-wheel is mounted.

The stays 4 are suitably supported on driven shaft 8, which has the drive-wheels 9 fixed thereto and having the rear ends of bars 3 secured thereto. (See Fig. 1.)

Reference-numeral 10 indicates the seat-post, which is yieldingly supported in the upper ends of stays 4 by a spring 11, which bears on the web 12 and against a pin arranged in said post at a point above said web. Loosely mounted on the said seat-post is a handle 13, which is adapted to be operated by the rider for steering the vehicle, the same being connected by rods 14 to a pair of arms 15, which are secured to and project from opposite sides of the head 6. This steering means forms no part of the present invention and obviously any other form can be substituted therefor at will.

The driving mechanism includes a pair of gears 16 and 17, the latter of which is mounted on a shaft 18, journaled in the side bars 1 of the frame. The mechanism for operating these gears forms no part of the present invention, the same having been made a part of my prior application, Serial No. 257,755, said mechanism being controlled by the rider, who swings the handle 19 back and forth, and this handle projects between the upper bars 3 of the frame and is thereby guided during its swinging movement.

Having thus fully described my invention, what I claim as new, and desire to secure by Letters Patent, is—

In a machine of the type set forth, a frame comprising side bars having their forward portions inclined upwardly in converging lines and formed with a socket, upper bars projecting between and secured to the forward portions of said side bars and formed with a sleeve alining with said socket, and stays secured to the rear portions of said upper and side bars.

Signed at Seattle, Washington, this 18th day of September, 1905.

GUSTAF A. LARSON.

Witnesses:
JOHN W. FILKINS,
S. B. FOLEY.